US011920671B1

(12) United States Patent
Dallapiccola et al.

(10) Patent No.: US 11,920,671 B1
(45) Date of Patent: Mar. 5, 2024

(54) LUBRICATION SYSTEM WITH A FLOW REGULATING FLOATER CONTAINER

(71) Applicant: DANA ITALIA S.R.L., Arco (IT)

(72) Inventors: Matteo Dallapiccola, Trento (IT); Pier Paolo Rinaldi, Arco (IT)

(73) Assignee: DANA ITALIA S.R.L., Arco (IT)

( * ) Notice: Subject to any disclaimer, the term of this patent is extended or adjusted under 35 U.S.C. 154(b) by 0 days.

(21) Appl. No.: 17/931,844

(22) Filed: Sep. 13, 2022

(51) Int. Cl.
*F16H 57/04* (2010.01)
*F01M 11/00* (2006.01)

(52) U.S. Cl.
CPC ....... *F16H 57/045* (2013.01); *F01M 11/0004* (2013.01); *F16H 57/0409* (2013.01); *F16H 57/0443* (2013.01); *F16H 57/0447* (2013.01); *F16H 57/0453* (2013.01); *F01M 2011/0041* (2013.01)

(58) Field of Classification Search
CPC ............. F16H 57/0409; F16H 57/0443; F16H 57/0447; F16H 57/0453; F16N 29/02; F16N 2270/14; F01M 2011/0041
See application file for complete search history.

(56) References Cited

U.S. PATENT DOCUMENTS

| | | | | |
|---|---|---|---|---|
| 5,197,569 A | * | 3/1993 | Roessler | .................... F16N 7/32 184/96 |
| 9,068,645 B2 | * | 6/2015 | Tamai | .................. F16H 57/0413 |
| 9,353,851 B2 | | 5/2016 | Kubota | |
| 2013/0126016 A1 | * | 5/2013 | Inoue | .................. F01M 11/0004 137/409 |
| 2022/0003135 A1 | * | 1/2022 | Rinaldi | ............... F16H 57/0453 |

FOREIGN PATENT DOCUMENTS

| | | | | |
|---|---|---|---|---|
| CN | 112354700 A | | 2/2021 | |
| DE | 3316117 A1 | * | 11/1983 | ......... F16H 57/0434 |
| DE | 102013222983 A1 | * | 5/2015 | ............. F16H 57/04 |
| DE | 102019218418 A1 | * | 6/2021 | |
| EP | 0411296 A1 | * | 2/1991 | ............. C23C 22/36 |
| EP | 1602861 A1 | | 12/2005 | |
| JP | 2008039072 A | * | 2/2008 | ......... F16H 57/0447 |
| KR | 101231360 B1 | * | 2/2013 | |
| KR | 101231360 B1 | | 2/2013 | |
| WO | WO-2018029054 A1 | * | 2/2018 | ............. F16H 57/04 |

* cited by examiner

*Primary Examiner* — Minh Truong
(74) *Attorney, Agent, or Firm* — McCoy Russell LLP

(57) ABSTRACT

A system and method for lubrication system are provided. The lubrication system includes a floater container including a floater compartment that contains a buoyant floater, where the floater container is coupled to a housing bulkhead and where the floater container includes an inlet opening in a first wall that is off-axis from a horizontal plane and forms an angle with a second wall. Further, the housing bulkhead includes an outlet opening positioned lower than the inlet opening and provides fluidic communication between the floater compartment and a rotating component compartment that contains a rotating component.

15 Claims, 4 Drawing Sheets

US 11,920,671 B1

LUBRICATION SYSTEM WITH A FLOW REGULATING FLOATER CONTAINER

TECHNICAL FIELD

The present disclosure relates to a lubrication system with a floater for regulating a lubrication level in a sump.

BACKGROUND AND SUMMARY

Inside mechanical devices, such as mechanical transmissions, lubricants, such as oils are used to decrease friction and dissipate heat within the devices to enhance device operation. Splash lubrication has been used in certain mechanical systems due to their relative simplicity and higher resistance to component degradation when compared to more complex lubrication systems.

EP 1602861 A1 to Matsufuji et al. discloses a transmission with a chamber containing a ring gear partially submerged in oil. The baffle plate that partially surrounds a rotating shaft and hold lubricant therein. The ring gear functions to drive splash lubrication which decreases friction in the system's components as well as cools the components. To circulate oil through the ring gear chamber, an orifice is provided which directs the oil to another chamber in the system.

The inventors have recognized several drawbacks not only with Matsufuji's transmission but other lubrication systems. Matsufuji's transmission may have churning losses which are too high for certain vehicle designs. For instance, electrified vehicle platforms may demand decreased transmission power losses to increase battery life and vehicle range while decreasing down-times. Further, prior oil regulating devices may not function as desired when the system is tilted, leading to low lubrication levels and causing component wear and decreased system longevity.

The inventors have recognized the aforementioned issues and developed a lubrication system to at least partially overcome the issues. The lubrication system includes a floater container and a floater compartment containing a buoyant floater. In the lubrication system, the floater container is coupled to a housing bulkhead and includes an inlet opening in a first wall that is off-axis from a horizontal plane and forms an angle with a second wall. Further in the system, the housing bulkhead includes an outlet opening positioned lower than the inlet opening and provides fluidic communication between the floater compartment and a rotating component compartment. Designing a floater container with these features allows the flowrate of lubricant entering the rotating component compartment to be passively regulated over a wider variety of operating conditions when compared to previous oil regulating mechanisms. Specifically, positioning the inlet opening on the off-axis wall allows for desired lubricant regulation when the system is tilted.

Further in one example, to allow for a desired lubricant flow regulation, the floater container and the buoyant floater may be configured to operate in an open position and a closed position. In the closed position, the buoyant floater inhibits a flow of lubricant through the inlet opening into the floater compartment of the floater container, and in the open position, the buoyant floater is spaced away from the inlet opening. In such an example, the position of the buoyant floater changes as a lubricant level in the floater compartment varies. In this way, the flowrate of lubricant into the rotating component compartment is precisely regulated to allow the rotating component to achieve an intended amount of lubricant that decreases component wear and removes heat therefrom without unduly increasing churning losses.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

A lubrication system is described herein that includes a floater assembly which strategically and passively controls an amount of lubricant delivered to a compartment that contains a gear or other suitable rotating component to strike a desired balance between gear lubrication and churning losses. The floater assembly controls the lubricant flow to the compartment over a wide range of system inclinations. As such, floater assembly functionality may be maintained over a wider operating window, which decreases the likelihood of an undesirable amount of lubricant within the gear enclosure which can cause churning losses if the level is too high or component wear if the level is too low. The sustained lubricant regulating functionality during tilting may be particularly desirable in vehicles and particularly electric vehicles. However, the lubrication system described herein is capable of usage in a variety of systems. To achieve the passive lubricant regulating functionality, the system includes a floater container with two walls that are angled with regard to a horizontal axis and constrain movement of a buoyant floater. One of these walls may include an opening that may be positioned higher than an opening in a bulkhead. The buoyant floater selectively blocks the opening in the wall to provide desired lubricant flow regulation which maintain the flowrate of lubricant through the other opening at a target flowrate or within a target flowrate range. Consequently, the lubricant around the gear can be maintained at a desired level or within a desired range that strikes a balance between gear lubrication and churning losses, if wanted. Further, the floater assembly may be efficient to manufacture and install in the transmission or other suitable system.

Figure 1:
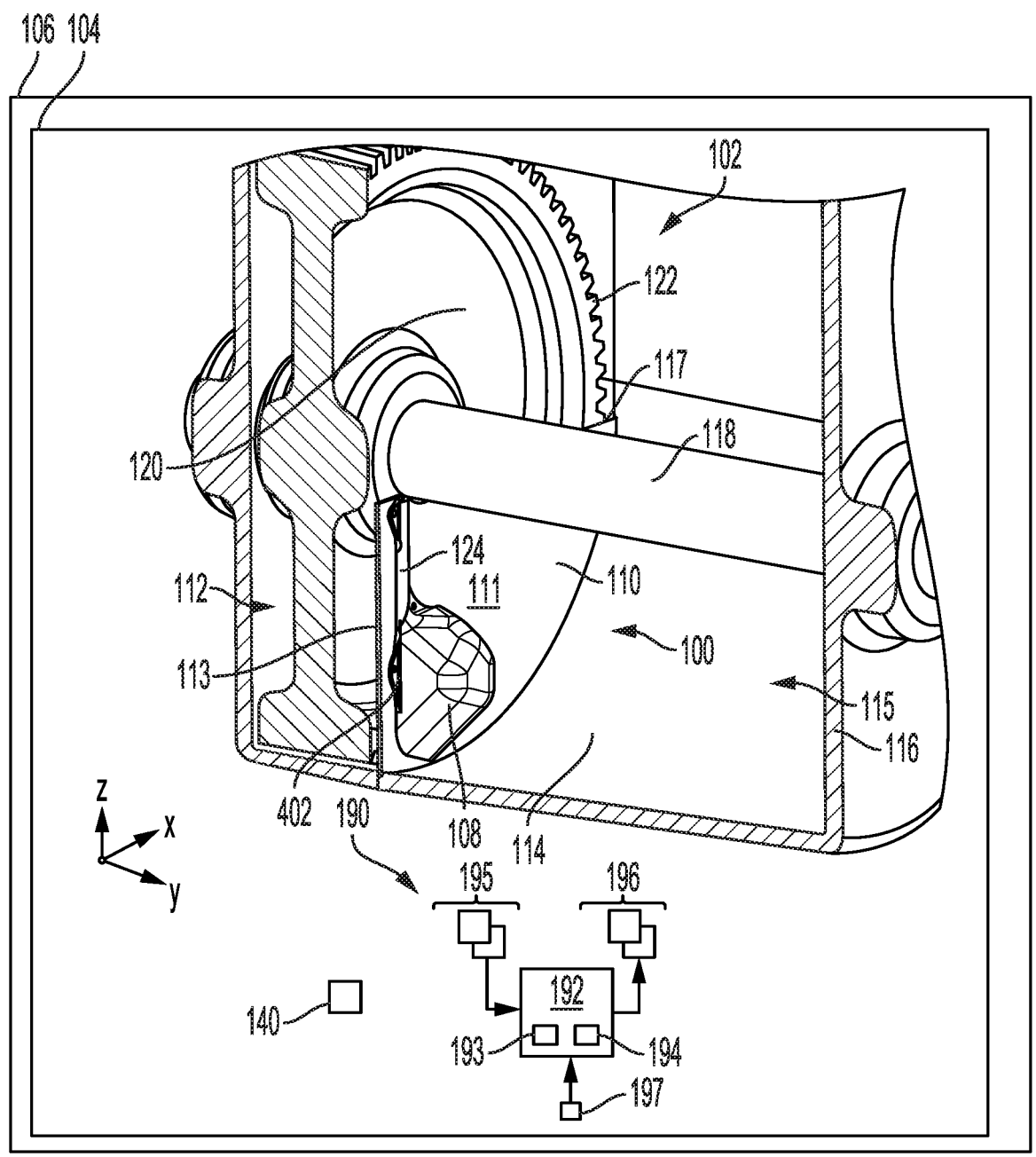
FIG. 1 is an illustration of a lubrication system.

FIG. 1 shows an example of a lubrication system 100. The lubrication system 100 may, in one example, be included in a gearbox 102 of a transmission 104. In turn, the transmission 104 may be included in a vehicle 106 such as an electric vehicle (EV) or an internal combustion engine (ICE) vehicle. In the EV example, the vehicle may be an all-electric vehicle or a hybrid electric vehicle. However, the lubrication system 100 may be used in other locations in the vehicle such as the axle or in entirely other operating environments such as in stationary machines. For instance, the lubrication system may be used in power plants, in other embodiments.

The lubrication system 100 includes a floater container 108 coupled to a housing bulkhead 110. The bulkhead 110 divides a rotating component compartment 112 from a calmer compartment 114. The rotating component compartment 112 and the calmer compartment 114 may form a sump 115 in the system. Thus, the calmer compartment may function as a lubricant reservoir and therefore be referred to as a reservoir or a source compartment for a buoyant floater compartment, which is elaborated upon herein. However, the sump may include other compartments in one example or solely include one of the aforementioned compartments, in another example. The bulkhead 110 includes a surface 111 in the calmer compartment 114 and a surface 113 in the rotating component compartment 112. Further, a top side 117 of the bulkhead 110 is positioned below the shaft 118 in the illustrated example.

In the illustrated example, the floater container 108 is coupled to the housing bulkhead 110. However, in other examples, the floater container 108 may be integrally formed with the housing bulkhead 110. The floater container 108 may be cast, machined into the transmission housing, or manufactured as a part of another component. As such, the bulkhead 110 may be used as a support surface for the floater container and/or for closing (e.g., bounding) the internal volume of the floater compartment. Attaching the floater container 108 to the housing bulkhead 110 enables system assembly to be efficiently carried out.

The lubrication system 100 may further include a housing 116 that forms at least a portion of the boundary of the calmer compartment 114. The bulkhead 110 is included in the housing 116 in the illustrated examples and therefore may be referred to as a housing bulkhead.

In the illustrated example, a shaft 118 is supported in the housing via bearings for example. However, other housing and shaft arrangements may be used in alternate examples. For instance, the shaft may pass through the housing in an unsupported manner.

A gear 120 or other suitable rotating component rotates on the shaft 118. The gear 120 includes teeth 122 that may mesh with teeth on another gear to enable mechanical power transfer between the gears. The teeth may be straight cut, helical cut, etc.

The floater container 108 may be coupled to the bulkhead 110 via attachment devices (e.g., bolts, screws, and the like), welds, combinations thereof, and the like. For instance, flanges 402 in the floater container 108 include openings that receive attachment devices, in the illustrated example. However, other suitable attachment techniques may be used to attach the floater container to the bulkhead, in other examples.

The floater container 108 includes a conduit 124 that extends vertically along the bulkhead 110, in the illustrated example. The conduit 124 provide fluidic communication between an area above a fluid level in the calmer compartment 114 and an internal floater compartment 204 in the floater container shown and expanded upon herein with regard to FIGS. 2-8. The lubricant in the floater compartment may have greater turbulence than the lubricant in the calmer compartment 114. The conduit 124 allows the lubricant in the calmer compartment 114, the internal floater compartment 204, shown in FIG. 2, and the rotating component compartment 112 to see the same air reference pressure. In other examples, the conduit may be omitted from the floater container and the container may be coupled to a tube or other conduit may enable the internal floater compartment and the calmer compartment to see a similar air pressure.

An axis system is provided in FIG. 1 as well as FIGS. 2-10, for reference. The z-axis may be a vertical axis (e.g., parallel to a gravitational axis), the x-axis may be a lateral axis (e.g., horizontal axis), and/or the y-axis may be a longitudinal axis, in one example. However, the axes may have other orientations, in other examples.

The transmission 104 may include a control system 190 with a controller 192 as shown in FIG. 1. The controller 192 may include a microcomputer with components such as a processor 193 (e.g., a microprocessor unit), input/output ports, an electronic storage medium 194 for executable programs and calibration values (e.g., a read-only memory chip, random access memory, keep alive memory, a data bus, and the like). The storage medium may be programmed with computer readable data representing instructions executable by a processor for performing the methods and control techniques described herein as well as other variants that are anticipated but not specifically listed.

The controller 192 may receive various signals from sensors 195 coupled to various regions of the transmission 104. Upon receiving the signals from the various sensors 195 of FIG. 1, the controller 192 processes the received signals, and employs various actuators 196 of system and/or transmission components to adjust the components based on the received signals and instructions stored on the memory of controller 192. For example, the controller 192 may send a command to a component 140 which drives rotation of an input of the transmission such as an electric motor. In response, the motor may drive rotation of the transmission's input and subsequently the gear 120. The other controllable components in the vehicle may function in a similar manner with regard to sensor signals, control commands, and actuator adjustment, for example. An input device 197 (e.g., an accelerator pedal, a brake pedal, a gear selector, combinations thereof, and the like) may be in electronic communication with the controller 192.

Figure 2:
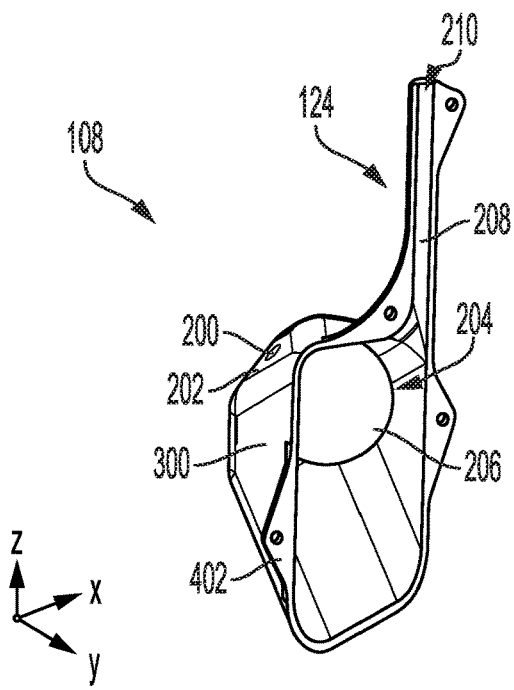
FIGS. 2-7 and 10 are different views of a floater container in the lubrication system, depicted in FIG. 1.

FIGS. 2-7 show different view of the floater container 108. As shown in FIG. 2 the floater container 108 includes an inlet opening 200 in a first wall 202. The inlet opening 200 extends through the first wall 202 and provides fluidic communication between the interior floater compartment 204 and the calmer compartment 114, shown in FIG. 1, when the opening isn't blocked by a buoyant floater 206. However, as shown in FIG. 2, the buoyant floater 206 blocks the inlet opening 200, thereby inhibiting fluidic communication through the inlet opening 200. Consequently, when the floater blocks the opening lubricant is prevented from flowing from the calmer compartment to the floater compartment 204. An internal surface (e.g., planar surface) of the first wall 202 along with other internal surfaces in the internal floater compartment 204 are profiled to constrain movement of the buoyant floater 206 and cause the floater to block the inlet opening 200 when the lubricant level in the compartment is greater than a threshold level and permit lubricant flow through the opening when the lubricant level drops below the threshold level. The profile of the surfaces in the floater compartment are expanded upon herein with regard to FIGS. 7-8.

The conduit 124 is again shown in FIG. 2. When the floater compartment 204 is coupled to the bulkhead 110, shown in FIG. 1, an air flow channel 208 is formed. The air flow channel 208 includes an upper opening 210 that opens into the calmer compartment 114, shown in FIG. 1, when installed. The air flow channel 208 extends in a vertical direction to allow the internal floater compartment 204 and the calmer compartment 114 to see the same air pressure. Consequently, the maximum flowrate into the rotating component compartment 112 (for splash lubrication) is defined by a diameter 800 of an outlet opening 802 in the bulkhead 110 (discussed in greater detail herein and shown in FIG. 8) opening the output hole diameter and the maximum lubricant level that can be reached in the internal floater compartment 204 of the floater container 108 before the floater 206 closes the inlet opening 200. FIG. 2 further shows a lateral side 300 of the container and one of the flanges 402 which include attachment device openings which enable attachment to the bulkhead 110, shown in FIG. 1. However, as previously indicated, the container may be coupled to the bulkhead using other suitable techniques, such as welding or integrally forming the container in the bulkhead via machining, casting, and the like.

Figure 3:
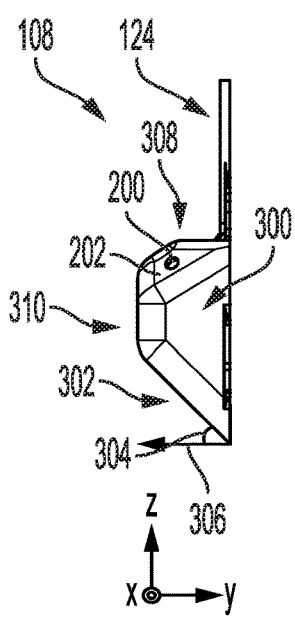

FIG. 3 shows a first side view of the floater container 108. A lateral side 300 and a lower wall 302 of the container are illustrated. The lower wall 302 forms an angle 304 with a lateral axis 306. Angling the lower wall in this manner allows the interior floater compartment of the container to achieve a desired volume and profile which allows the floater to move away from the opening 200 during certain conditions but not block the outlet opening 802 in the bulkhead 110, shown in FIG. 8 and discussed in greater detail herein. The conduit 124 is again shown and extends from an upper wall 308 in the floater container. Further, a front wall 310 of the floater container 108 is depicted.

Figure 4:
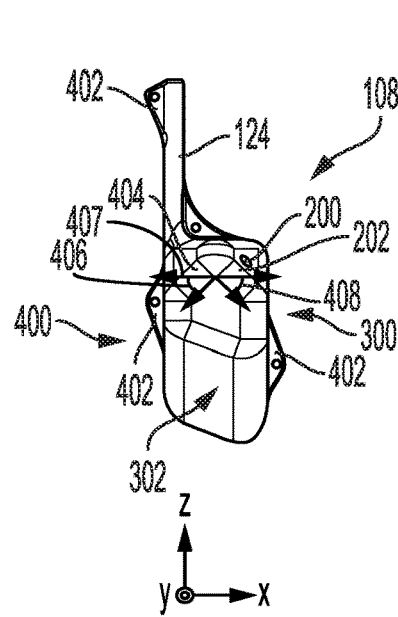

FIG. 4 shows a front view of the floater container 108. The conduit 124 is again shown along with the lateral side 300 and an opposing lateral side 400. Flanges 402 with attachment device openings may be used to attach the container to the bulkhead 110, shown in FIG. 1.

The floater container 108 further includes the first wall 202 and a second wall 404 which are angled (with regard to a horizontal axis) and abut one another. As such, the first wall 202 forms an angle 406 with a horizontal axis 407 and the second wall 404 forms an angle 408 with the horizontal axis which may be equivalent to one another. The inlet opening 200 is positioned in the first wall 202. Arranging the first and second walls 202 and 404 in this manner in relation to the surface 111 of the bulkhead 110, shown in FIG. 1, allows the walls to guide the buoyant floater into a blocking position for the inlet opening 200 when the lubricant level within the interior floater compartment of the container is above a threshold level and allows the inlet opening 200 to be blocked when the floater container 108 (and the system more generally) is tilted. Consequently, a desired lubricant flowrate or range of flowrates into the rotating component compartment is maintained over a wide range of system operating conditions.

Figure 5:
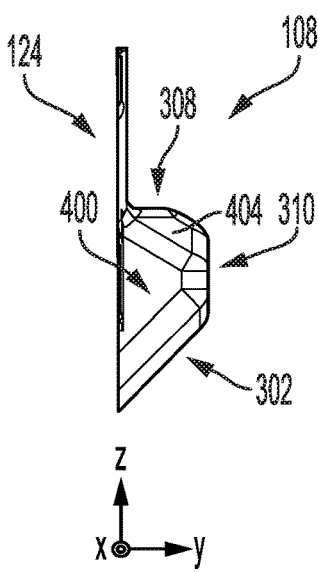

FIG. 5 shows the lateral side 400 of the floater container 108 as well as the conduit 124. The lower wall 302, the upper wall 308, the front wall 310, and the second wall 404 of the container is further shown in FIG. 5.

Figure 6:
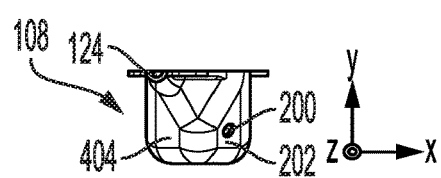

FIG. 6 shows a top view of the floater container 108 with the first wall 202, the second wall 404, and the inlet opening 200. The conduit 124 is further shown in FIG. 6.

Figure 7:
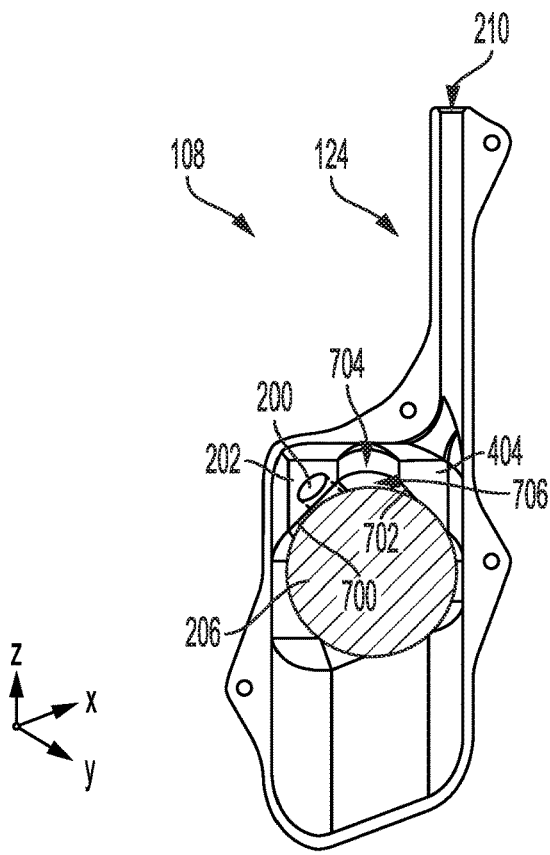

FIG. 7 shows a rear view of the floater container 108 with a buoyant floater 206 contained therein. The first wall 202 and the second wall 404 are again shown. Interior surfaces 700 and 702 of the first and second walls 202 and 404, respectively are additionally illustrated. The surfaces 700 and 702 may be planar to enable the floater to be guided into and out of a position that blocks the inlet opening 200 to be smoothly achieved. It will be understood, that a portion of the surface 111 of the bulkhead 110, shown in FIG. 2, forms another boundary of the interior floater compartment 204 and enables the guidance of the buoyant floater 206 into and out of the position which blocks the inlet opening 200. Therefore, as the lubricant level in the interior floater compartment varies, the floater 206 is pushed into and out of a position which blocks the inlet opening 200. In this way the floater compartment is refilled with lubricant. The floater functionality with regard to lubricant flow through the inlet opening is expanded upon herein with regard to FIG. 8. The surfaces 700 and 702 abut at section 704 which may be arranged at or near an uppermost portion 706 of the interior floater compartment 204. In this way, the floater 206 is restrained in a section of the compartment when the lubricant in the compartment is above a threshold level.

Figure 8:
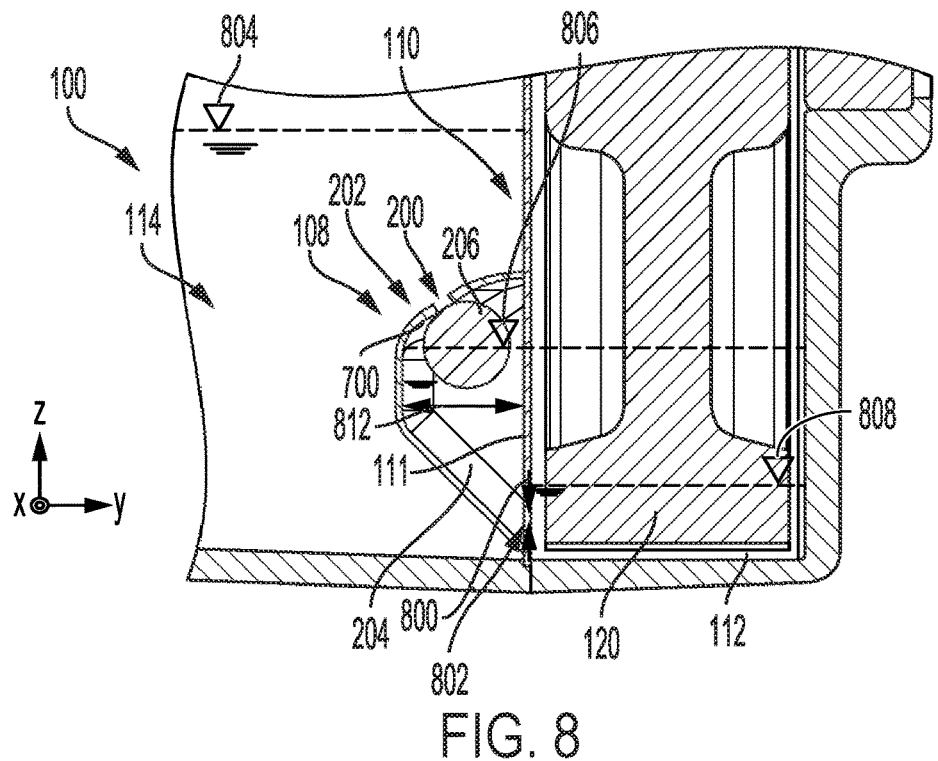
FIG. 8 is a cross-sectional view of the lubrication system, depicted in FIG. 1.

FIG. 8 shows a cross-sectional view of the lubrication system 100. The floater container 108, the buoyant floater 206, the gear 120, the rotating component compartment 112, calmer compartment 114, and housing bulkhead 110 are again illustrated.

The calmer compartment 114 includes a lubricant level 804 which is higher than the inlet opening 200. The lubricant level 804 is higher than the inlet opening but lower than the upper opening 210 in the conduit 124, shown in FIG. 7.

The inlet opening 200 in the floater container 108 and the outlet opening 802 in the bulkhead 110 are further illustrated. The lubricant level 806 within the internal floater compartment 204 dictates the vertical position (along an axis parallel to the z-axis) of the buoyant floater 206. The lubricant level 806 is a threshold lubricant level that trigger blocking of the inlet opening 200 via the buoyant floater 206 due to the buoyancy of the floater pushing the floater into sealing engagement with the inlet opening 200. When the floater 206 blocks the inlet opening lubricant flow from the calmer compartment 114 to the floater compartment 204 is inhibited. The height of the lubricant in the floater compartment 204 (along with the diameter 800 of the outlet opening 802) dictates the flowrate of lubricant through the outlet opening due to the free surfaces of the lubricant in the calmer compartment 114, the floater compartment 204, and the rotating component compartment 112 being exposed to a similar reference air pressure.

When the lubricant level in the floater compartment 204 drops below the threshold level 806, lubricant flows through the inlet opening 200 and refills lubricant in the compartment until the floater again reaches the height which blocks the inlet opening. During both conditions (when the inlet opening is blocked and open) lubricant flows through the outlet opening 802 (e.g., housing bulkhead opening) into the rotating component compartment 112. A lubricant level 808 in the rotating component compartment 112 is further illustrated in FIG. 8. Rotation of the gear 120 or other suitable rotating component then drives splash lubrication in the rotating component compartment. The splash lubricant may either be returned to the calmer compartment 114 or flow back to the lower portion of the rotating component compartment. In this way, the lubricant in the rotating component compartment is turbulent while lubricant in the calmer compartment where some of the splash lubricant is collected has less bulk motion.

The interior surface 700 of the first wall 202, the interior surface 702 of the second wall 404 shown in FIG. 7, and the surface 111 of the bulkhead 110 constrain movement of the floater and guided it through desired blocking and unblocking cycles. Furthermore, one or more of the aforementioned surfaces may be planar to precisely guide the floater in a desired direction as the lubricant level changes.

Figure 10:
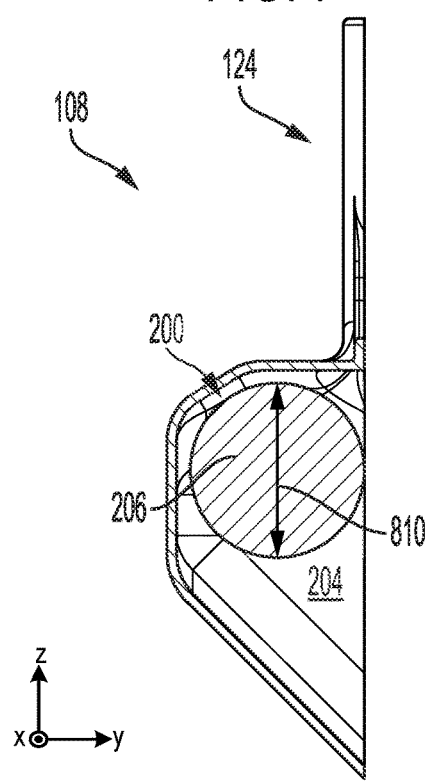

A diameter 810 of the floater 206, illustrated in FIG. 10, may be between 30 millimeters (mm) and 40 mm, in one example. Sizing the floater in this manner allows the floater to achieve a desired buoyancy to seal the inlet port while being small enough to be reasonably installed in a gearbox or other suitable mechanical system without interfering with component therein. However, the floater may have a different diameter, in other examples. The size of the floater may be selected based on factors such as the type of lubricant used in the system, the material construction of the floater, the expected operating air pressure in the system, and the like. FIG. 10 again shows the floater 206 in the interior floater compartment 204 of the floater container 108 along with the opening 200 in the floater container as well as the conduit 124 in the floater container.

A width 812 (front to rear) of the interior floater compartment 204, shown in FIG. 8, is greater than the diameter 810 of the buoyant floater 206, shown in FIG. 10, to allow the floater to move away from the inlet opening 200 when the lubricant level falls.

Further, the surfaces that surround the floater compartment 204 may be designed to reduce the likelihood (e.g., avoid) locking of the floater in the compartment due to floater expansion and/or other reasons. To elaborate, the floater 206, in the upper position, is located by three planes (the surfaces 700, 702 and the bulkhead surface 111, shown in FIG. 1). Considering the cone tangent to the three planes, the aperture of the cone inhibits the floater from self-locking in the cone. To elaborate, the cone's aperture angle may be >20°. Further, to reduce the likelihood of floater locking, the diameter of the floater may be significantly less than the dimensions of the surfaces that bound the interior compartment of the floater container such as the surfaces 700, 702 and the portion of the bulkhead surface that demarcates the interior compartment.

Figures 9A, 9B:
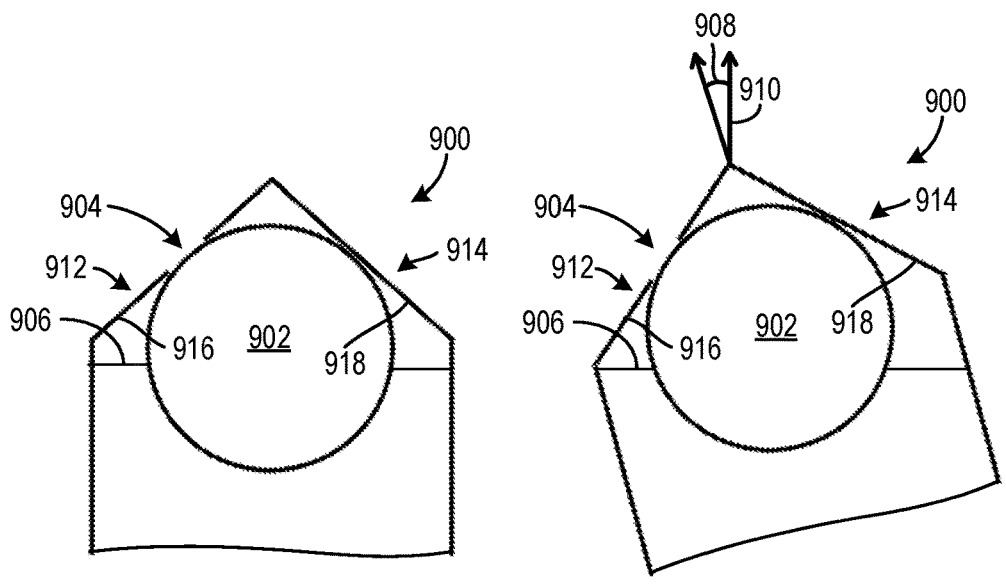
FIGS. 9A-9B are illustrations of an example of a floater container in level position and a tilted position.

FIGS. 9A and 9B depict an exemplary floater container 900 with a buoyant floater 902 that blocks an inlet opening 904 due to the lubricant level 906 in the floater compartment 204. It will be appreciated that the floater container 900 and the buoyant floater 902 may exhibit at least some structural and functional features that are similar to floater container 108 and the buoyant floater 206 depicted in FIGS. 1-8. Repeated description of these features is omitted for concision. FIG. 9A specifically shows the floater container 900 at an upright position and FIG. 9B shows the container at a tilted position with the container forming an angle 908 with a vertical axis 910. As shown, the floater 206 blocks the inlet opening 904 in both the upright position and the tilted position. Walls 912 and 914 which abut one another and guide movement of the floater 902 into and out of a blocking position are further illustrated in FIGS. 9A and 9B. Interior surfaces (e.g., planar surfaces) 916 and 918 of the walls 912 and 914 respectively are further illustrated. The floater compartment may be profiled to maintain the floater in sealing contact with the inlet opening when the compartment is tiled in a range between 0° and 90° minus the angle associated with the semi-aperture of the cone, in one example. To elaborate, the range may be between 0° and 70°, in one specific example.

FIGS. 1-9B provide for a method for operation of a lubrication system. The method includes rotating a gear on a shaft. In such an example, a portion of the gear is submerged in lubricant that is contained in a gear compartment and a level of the lubricant contained in the gear compartment is controlled via passive metering of lubricant through a housing bulkhead opening that provides fluidic communication between the gear compartment and a floater compartment of a floater container.

The technical effect of the lubrication system operating method described herein is to efficiently provide a desired amount of lubricant to a gear via a system with a construction with a low likelihood of component degradation and simplified installation.

FIGS. 1-8 and 10 are drawn approximately to scale aside from the schematically illustrated components. Although other relative component dimensions may be used, in other embodiments.

FIGS. 1-10 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

The invention will be further described in the following paragraphs. In one aspect, a lubrication system is provided that comprises a floater container including a floater compartment that contains a buoyant floater; wherein the floater container is coupled to a housing bulkhead; wherein the floater container includes an inlet opening in a first wall that is off-axis from a horizontal plane and forms an angle with a second wall; and wherein the housing bulkhead includes an outlet opening positioned lower than the inlet opening and provides fluidic communication between the floater compartment and a rotating component compartment that contains a rotating component.

In another aspect, a method for operation of a lubrication system is provided that comprises rotating a gear on a shaft; wherein a portion of the gear is submerged in lubricant that is contained in a gear compartment; wherein a level of the lubricant contained in the gear compartment is controlled via passive metering of lubricant through a housing bulkhead opening that provides fluidic communication between the gear compartment and a floater compartment of a floater container; and wherein the floater container includes a buoyant floater contained in an interior compartment that selectively blocks a container opening that provides fluidic communication between a compartment and the floater compartment.

In another aspect, a lubrication system in a gearbox of a transmission is provided that comprises a calmer compartment with a lubricant therein; and a floater container containing a buoyant floater in a floater compartment; wherein the floater compartment and the buoyant floater passively regulate an amount of lubricant flowing from the floater compartment to a gear compartment through an outlet opening of a housing bulkhead; and wherein the floater compartment includes an inlet opening in a first wall that is angled in relation to a horizontal plane and abuts a second wall that is angled in relation to the horizontal plane.

In any of the aspects or combinations of the aspects, the housing bulkhead may include a first side that is coupled to the floater container and define a portion of the boundary of the floater compartment; and a second side that forms a portion of the boundary of a rotating component compartment; and wherein the housing bulkhead divides a calmer compartment from the rotating component compartment.

In any of the aspects or combinations of the aspects, the floater container and the buoyant floater may be configured to operate in an open position and a closed position, in a closed position the buoyant floater inhibits a flow of lubricant through the inlet opening into the floater compartment of the floater container and in an open position, the buoyant floater is spaced away from the inlet opening, wherein the position of the buoyant floater changes as a lubricant level in the floater compartment varies.

In any of the aspects or combinations of the aspects, the inlet opening may be positioned below a top of the floater compartment.

In any of the aspects or combinations of the aspects, the floater container may be configured to inhibit a hydrostatic head in the floater compartment from falling below a threshold value.

In any of the aspects or combinations of the aspects, an external surface in the housing bulkhead may abut the first wall and the second wall in the floater compartment.

In any of the aspects or combinations of the aspects, the lubrication system may further comprise a conduit extending vertically from the floater compartment and including an opening that is positioned above a lubricant level in the calmer compartment and profiled to provide fluidic communication between an interior of the floater compartment and the calmer compartment.

In any of the aspects or combinations of the aspects, the conduit may extend toward a shaft on which the rotating component rotates during operation.

In any of the aspects or combinations of the aspects, the floater container may include a lower wall sloping toward the housing bulkhead.

In any of the aspects or combinations of the aspects, a housing bulkhead of the calmer compartment may include at least one bearing that is coupled to a shaft on which the rotating component rotates.

In any of the aspects or combinations of the aspects, the floater may have a diameter between 30 millimeters (mm) and 40 mm.

In any of the aspects or combinations of the aspects, the lubrication system may be included in a gearbox and the rotating component is a gear.

In any of the aspects or combinations of the aspects, the floater container may include a conduit which extending vertically and including an opening that is positioned above a lubricant level in the calmer compartment and profiled to provide fluidic communication between an interior of the floater compartment and the calmer compartment.

In any of the aspects or combinations of the aspects, when a lubricant level is above a threshold value, the buoyant floater may block the inlet opening.

In any of the aspects or combinations of the aspects, the air pressure in the floater compartment, the calmer compartment, and the container may be substantially equal.

In any of the aspects or combinations of the aspects, the first wall and the second wall may be planar.

In any of the aspects or combinations of the aspects, the floater compartment may be coupled to the housing bulkhead.

In any of the aspects or combinations of the aspects, the inlet opening may be blocked when the floater compartment is tilted in a range between 0° and 85° from vertical.

In another representation, a passive floater assembly is provided that comprises a case that contains a floating device and includes angled walls, wherein the floating device blocks an inlet in one of the angled walls when oil in the interior of the container is above a threshold value and the passive floater assembly is tilted.

Note that the example control and estimation routines included herein can be used with various powertrain and/or other system configurations. The control methods and routines disclosed herein may be stored as executable instructions in non-transitory memory and may be carried out by the control system including the controller in combination with the various sensors, actuators, and other system hardware in combination with the electronic controller. As such, the described actions, operations, and/or functions may graphically represent code to be programmed into non-transitory memory of the computer readable storage medium in the system.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations disclosed herein are exemplary in nature, and that these specific examples are not to be considered in a limiting sense, because numerous variations are possible. For example, the above technology can be applied to transmissions or other mechanical systems in which lubrication is desired. In the transmission example, the powertrain may include different types of propulsion sources including different types of electric machines and/or internal combustion engines. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range, unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A lubrication system, comprising:
a floater container including a floater compartment that contains a buoyant floater;
wherein the floater container is coupled to a housing bulkhead;
wherein the floater container includes an inlet opening in a first wall that is off-axis from a horizontal plane and forms an angle with a second wall;
wherein the housing bulkhead includes an outlet opening positioned lower than the inlet opening and provides fluidic communication between the floater compartment and a rotating component compartment that contains a rotating component;
wherein the housing bulkhead includes:
a first side that is coupled to the floater container and defines a portion of a boundary of the floater compartment; and
a second side that forms a portion of a boundary of the rotating component compartment; and
wherein the housing bulkhead divides a compartment from the rotating component compartment; and
a conduit extending vertically from the floater compartment and including an opening that is positioned above a lubricant level in the compartment and profiled to provide fluidic communication between an interior of the floater compartment and the compartment.

2. The lubrication system of claim 1, wherein the floater container and the buoyant floater are configured to operate in an open position and a closed position, wherein, in the closed position, the buoyant floater inhibits a flow of lubricant through the inlet opening into the floater compartment of the floater container and, in the open position, the buoyant floater is spaced away from the inlet opening, and wherein a position of the buoyant floater changes as a lubricant level in the floater compartment varies.

3. The lubrication system of claim 1, wherein the inlet opening is positioned below a top of the floater compartment.

4. The lubrication system of claim 1, wherein the floater container is configured to inhibit a hydrostatic head in the floater compartment from falling below a threshold value.

5. The lubrication system of claim 1, wherein an external surface in the housing bulkhead abuts the first wall and the second wall in the floater compartment.

6. The lubrication system of claim 1, wherein the conduit extends toward a shaft on which the rotating component rotates during operation.

7. The lubrication system of claim 6, wherein the shaft is supported in the housing bulkhead via bearings.

8. The lubrication system of claim 6, wherein the shaft passes through the housing in an unsupported manner.

9. The lubrication system of claim 1, wherein the floater container includes a lower wall sloping toward the housing bulkhead.

10. The lubrication system of claim 1, wherein the housing bulkhead is positioned below a shaft on which the rotating component rotates.

11. The lubrication system of claim 1, wherein the buoyant floater has a diameter between 30 millimeters (mm) and 40 mm.

12. The lubrication system of claim 1, wherein the lubrication system is included in a gearbox and the rotating component is a gear.

13. The lubrication system of claim 1, wherein the floater compartment coupled with the housing bulkhead forms an air flow channel.

14. The lubrication system of claim 1, wherein the floater container is integrally formed with the housing bulkhead.

15. A method for operation of a lubrication system, comprising:
rotating a gear on a shaft;
wherein a portion of the gear is submerged in lubricant that is contained in a gear compartment;
wherein a level of the lubricant contained in the gear compartment is controlled via passive metering of lubricant through a housing bulkhead opening that provides fluidic communication between the gear compartment and a floater compartment of a floater container;
wherein the floater container includes a buoyant floater contained in an interior compartment that selectively blocks an inlet opening in the floater container that provides fluidic communication between a compartment and the floater compartment; and
wherein the floater container includes a conduit extending vertically and including an opening that is positioned above a lubricant level in the compartment and profiled to provide fluidic communication between an interior of the floater compartment and the compartment.

* * * * *